United States Patent
Kawada

(10) Patent No.: US 8,183,304 B2
(45) Date of Patent: May 22, 2012

(54) PROCESS FOR PRODUCING SOLID POLYELECTROLYTE FILM BY GRAFT-POLYMERIZING POLYMERIZABLE MONOMER WITH FLUORORESIN FILM, SOLID POLYELECTROLYTE FILM OBTAINABLE BY THE PROCESS, AND FUEL CELL

(75) Inventor: Nobuo Kawada, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1153 days.

(21) Appl. No.: 11/912,779

(22) PCT Filed: Apr. 21, 2006

(86) PCT No.: PCT/JP2006/308445
§ 371 (c)(1),
(2), (4) Date: Oct. 26, 2007

(87) PCT Pub. No.: WO2006/120871
PCT Pub. Date: Nov. 16, 2006

(65) Prior Publication Data
US 2009/0017358 A1    Jan. 15, 2009

(30) Foreign Application Priority Data
May 6, 2005   (JP) .............................. P. 2005-135056

(51) Int. Cl.
*C08J 3/28* (2006.01)
*H01M 8/10* (2006.01)

(52) U.S. Cl. ........ 522/149; 429/491; 429/492; 429/493; 429/494

(58) Field of Classification Search .......................... None
See application file for complete search history.

(56) References Cited

FOREIGN PATENT DOCUMENTS

| JP | 11-96832 A | 4/1999 |
|---|---|---|
| JP | 2001-283635 A | 10/2001 |
| JP | 2001-348439 A | 12/2001 |
| JP | 2002-313364 A | 10/2002 |
| JP | 2003-82129 A | 3/2003 |
| JP | 2005-71694 A | 3/2005 |
| JP | 2005-78871 A | 3/2005 |
| WO | WO 2005/001037 * | 1/2005 |
| WO | WO 2005/001037 A2 | 1/2005 |

OTHER PUBLICATIONS

Machine translation of JP 2005-078871, Oba et al., Mar. 24, 2005.*
Deng et al., Journal of Applied Polymer Science, vol. 68, pp. 747-763 (1998).
Office Action dated Jun. 8, 2010 for Japanese Application No. 2005-135056.
The supplementary European Search Report for EP Appl. No. 06745576.6, dated Jul. 21, 2009.

* cited by examiner

*Primary Examiner* — Barbara Gilliam
*Assistant Examiner* — Kwang Han
(74) *Attorney, Agent, or Firm* — Birch, Stewart, Kolasch & Birch, LLP

(57) ABSTRACT

A high-performance solid polyelectrolyte film is provided which is produced by the radiation-induced graft polymerization method without causing solution gelation and which is excellent in mechanical strength, chemical stability, and dimensional stability and reduced in methanol permeability. According to the present invention, the solid polyelectrolyte film is produced by graft-polymerizing either a polymerizable monomer having an alkoxysilyl group alone or the polymerizable monomer having an alkoxysilyl group and another polymerizable monomer with a resin film which has been irradiated with a radiation, followed by hydrolyzing the alkoxysilyl groups to conduct dehydrating condensation. In addition, this solid polyelectrolyte film is disposed between a fuel electrode and an air electrode to fabricate a fuel cell.

4 Claims, No Drawings

PROCESS FOR PRODUCING SOLID POLYELECTROLYTE FILM BY GRAFT-POLYMERIZING POLYMERIZABLE MONOMER WITH FLUORORESIN FILM, SOLID POLYELECTROLYTE FILM OBTAINABLE BY THE PROCESS, AND FUEL CELL

TECHNICAL FIELD

The present invention relates to a solid polyelectrolyte film, a process for producing the same, and a fuel cell.

BACKGROUND ART

With the trend toward performance elevation in portable information appliances such as notebook type PCs, PDAs, and portable telephones, there is a demand for a small high-capacity power source. A direct-methanol fuel cell (DMFC) is increasingly expected to be a potent example thereof. A DMFC is a fuel cell in which electrical energy is directly taken out from the chemical reaction of methanol with oxygen, and has merits that it has a high theoretical volume energy density and can be continuously used with refueling.

In initial fuel cells of the solid polyelectrolyte film type, an ion-exchange membrane including a hydrocarbon resin produced by copolymerizing styrene and divinylbenzene was employed as an electrolyte film. This electrolyte film, however, had problems that it had low durability and necessitated complicated steps. In order to improve such durability, a crosslinked polymer obtained by crosslinking with a silane a polymer having sulfo and alkoxysilyl groups bonded to the main chain not through a benzene ring has been investigated as an electrolyte film for fuel cells (see patent document 1). However, this electrolyte film has a problem that its mechanical strength is insufficient, although chemically stable. Production by the radiation-induced graft polymerization method has also been investigated as a technique capable of improving durability as well as facilitating production (see, for example, patent documents 2 to 4).

Since a fluororesin excellent in mechanical strength and chemical stability can be used as a base for the solid polyelectrolyte film produced by the radiation-induced graft polymerization method, that technique is advantageous for improving the mechanical strength and chemical stability of an electrolyte film (long life), improving dimensional stability (low swelling), and reducing methanol permeability. However, when a polyfunctional polymerizable monomer such as divinylbenzene or bisacrylamide is used as a crosslinking agent, there is a problem that the solution gels during the grafting reaction. Although gel removal is easy in the production on a laboratory scale, there is a possibility that a considerable difficulty might arise in industrial-scale continuous production.

Furthermore, a technique has been investigated in which an alkoxysilane is infiltrated into a perfluororesin electrolyte film, followed by conducting hydrolysis/dehydrating condensation to precipitate silica in ion channels thereby reducing methanol permeability (see, for example, non-patent document 1). However, there is a possibility that a problem concerning stability might arise, since the silica has no chemical bonds with the electrolyte film.

Patent Document 1: JP-A-2001-283635
Patent Document 2: JP-A-2001-348439
Patent Document 3: JP-A-2002-313364
Patent Document 4: JP-A-2003-82129
Non-Patent Document 1: *Journal of Applied Polymer Science*, Vol. 68, 747-763 (1998)

DISCLOSURE OF THE INVENTION

Problems that the Invention is to Solve

An object of the invention, which has been achieved under those circumstances, is to provide a high-performance solid polyelectrolyte film which is produced by a radiation-induced graft polymerization method without causing solution gelation, and is excellent in chemical stability and dimensional stability and reduced in methanol permeability.

Means for Solving the Problems

The present inventor have made investigations on methods for avoiding solution gelation. As a result, it was found that crosslinking can be carried out without solution gelation by subjecting polymerizable monomers including a polymerizable monomer having an alkoxysilyl group to radiation-induced graft polymerization, followed by causing the alkoxysilyl groups to undergo hydrolysis/dehydrating condensation after the graft polymerization. It was also found that, by further incorporating an alkoxysilane and causing it to undergo co-hydrolysis/dehydrating condensation with the alkoxysilyl groups, an increased crosslink density is attained and the degree of swelling in water and methanol permeability can be further reduced, as well as chemical bonds are found to be thus formed between the silica and the electrolyte film to thereby improve stability. It was also found that by using a polymerizable monomer having a vinylphenyl group ($CH_2=CH-C_6H_4-$) in the molecule thereof as the polymerizable monomer having an alkoxysilyl group, the content of alkoxysilyl groups in the graft polymer film can be greatly heightened as compared with the case of vinyl groups, and the degree of swelling and methanol permeability can be further reduced. The invention has been thus achieved based on such findings.

Namely, the invention provides the solid polyelectrolyte film, process for producing the same, and fuel cell shown below.

(1) A process for producing a solid polyelectrolyte film by graft-polymerizing a polymerizable monomer with a resin film which has been irradiated with a radiation, said process comprising:

(a) a step of irradiating a resin film with a radiation;

(b) a step of graft-polymerizing either a polymerizable monomer having an alkoxysilyl group alone or the polymerizable monomer having an alkoxysilyl group and another polymerizable monomer, with the resin film which has been irradiated with the radiation; and (c) a step of hydrolyzing the alkoxysilyl group to conduct a dehydrating condensation.

(2) The process for producing a solid polyelectrolyte film according to (1), wherein, in the step (b), the polymerizable monomer having an alkoxysilyl group and a monomer having an ion-conductive group are graft-polymerized.

(3) The process for producing a solid polyelectrolyte film according to (1), wherein, in the step (b), the polymerizable monomer having an alkoxysilyl group and a monomer having no ion-conductive group are graft-polymerized; and wherein said process further comprises:

(d) a step of introducing an ion-conductive group after the step (b) or after the step (c).

(4) The process for producing a solid polyelectrolyte film according to any one of (1) to (3), which further comprises:

(e) a step of introducing an alkoxysilane into the resin film which has undergone said graft polymerization after the step (b).

(5). The process for producing a solid polyelectrolyte film according to any one of (1) to (4), wherein the resin film is a fluororesin film.

(6) The process for producing a solid polyelectrolyte film according to any one of (1) to (5), wherein the polymerizable monomer having an alkoxysilyl group is a polymerizable monomer having a vinylphenyl group in a molecule thereof.

(7). A solid polyelectrolyte film which is obtainable by the process according to any one of (1) to (6).

(8) A fuel cell, which comprises the solid polyelectrolyte film according to (7) disposed between a fuel electrode and an air electrode.

(9) The fuel cell according to (8), which is of the direct-methanol type in which methanol is used as a fuel.

Advantages of the Invention

According to the invention, a high-performance solid polyelectrolyte which is excellent in mechanical strength, chemical stability, and dimensional stability and has low methanol permeability can be obtained. In addition, since the solution gelation is inhibited, the process is excellent also in productivity.

BEST MODE FOR CARRYING OUT THE INVENTION

The invention will be explained below in detail.

The resin film to be used in the invention preferably is a film or sheet composed of a fluororesin. Preferable examples of the fluororesin include polytetrafluoroethylene, tetrafluoroethylene/perfluoroalkyl vinyl ether copolymers, tetrafluoroethylene/hexafluoropropylene copolymers, and ethylene/tetrafluoroethylene copolymers, because they have excellent film properties and are suitable for the radiation-induced graft polymerization method. These resins may be used alone or in a suitable combination thereof.

The thickness of the resin film may be the same as those of general solid polyelectrolyte films, and is preferably from 10 μm to 200 μm, more preferably from 20 μm to 100 μm. When the thickness thereof is smaller than 10 μm, it is undesirable because such films are apt to break. When the thickness thereof exceeds 200 μm, it is undesirable because such films have increased electrical resistance. Incidentally, a simple technique for forming a fluororesin into a thin film is extrusion molding.

The resin film is first irradiated with a radiation preferably in an atmosphere with inert gas, such as $N_2$, He, or Ar, for example, at room temperature. The radiation preferably is electron beam, γ-ray, or X-ray, and electron beam is especially preferable. The irradiation dose depends on the kind of the radiation and on the kind and thickness of the resin film. For example, in the case where a film of the fluororesin is irradiated with electron beam, the irradiation dose is preferably 1-200 kGy, more preferably 1-100 kGy.

Subsequently, the resin film which has undergone the radiation irradiation is grafted with polymerizable monomers containing a polymerizable monomer having an alkoxysilyl group. Examples of the polymerizable monomer having an alkoxysilyl group include vinyltrimethoxysilane, vinyltriethoxysilane, vinyltris(β-methoxyethoxy)silane, γ-acryloxypropylmethyldimethoxysilane, γ-acryloxypropylmethyldiethoxysilane, γ-acryloxypropyltrimethoxysilane, γ-acryloxypropyltriethoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-(acryloxyethoxy)propyltrimethoxysilane, γ-(acryloxyethoxy)propyltriethoxysilane, γ-(methacryloxyethoxy)propyltrimethoxysilane, γ-methacryloxyethoxy)propyltriethoxysilane, hexenyltrimethoxysilane, hexenyltriethoxysilane, decenyltrimethoxysilane, and decenyltriethoxysilane. Among these, monomers having a vinylphenyl group in the molecule thereof, such as trimethoxysilylstyrene, triethoxysilylstyrene, vinylbenzyltrimethoxysilane, vinylbenzyltriethoxysilane, vinylphenethyltrimethoxysilane, and vinylphenethyltriethoxysilane, are especially preferred because such monomers can greatly heighten the content of alkoxysilyl groups in the graft polymer film. Those polymerizable monomers having an alkoxysilyl group may be used alone or in a suitable combination thereof.

The other polymerizable monomers preferably are monofunctional polymerizable monomers. For example, styrene monomers such as styrene, α-methylstyrene, and trifluorostyrene and monomers having an ion-conductive group such as a sulfo group, sulfonamide group, carboxy group, phosphate group, or quaternary ammonium salt group (e.g., sodium acrylate, sodium acrylamidomethylpropanesulfonate, and sodium styrenesulfonate) can be used alone or in a suitable combination thereof. Furthermore, a polyfunctional polymerizable monomer can be used in such a manner that a difference in reactivity between the functional groups is utilized.

The grafting may be accomplished, for example, by a method in which the resin film which has been irradiated with a radiation is immersed in a solution containing both a polymerizable monomer having an alkoxysilyl group and another polymerizable monomer and is then heated at 50-80° C. in a nitrogen atmosphere for 10-20 hours. The degree of grafting is preferably 10-100%.

The resin film which has undergone the grafting is subsequently subjected to a crosslinking by the hydrolysis and dehydrating condensation of the alkoxysilyl groups. The hydrolysis may be accomplished, for example, by immersing the resin film which has undergone the grafting in a hydrochloric acid/DMF mixture solution at room temperature for 10-20 hours. The dehydrating condensation may be accomplished by heating the hydrolyzed resin film at 100-200° C. at a reduced pressure for several hours. In this time, a tin catalyst such as dibutyltin dilaurate may be used in order to cause the reaction to proceed under mild conditions.

In the case of a monomer having no ion-conductive group, ion-conductive groups such as sulfo, carboxy, or quaternary ammonium salt groups are introduced into the graft chains, whereby a solid polyelectrolyte film of the invention is obtained. For introducing sulfo groups, a method heretofore in use may be employed. For example, the resin film may be brought into contact with chlorosulfonic acid or fluorosulfonic acid to sulfonate the graft chains. Use may be made of a method in which sulfonation is conducted before the dehydrating condensation and the hydrolysis is omitted.

Furthermore, the resin film which has undergone the grafting may be immersed in an alkoxysilane to cause it to undergo co-hydrolysis and co-dehydrating condensation with the alkoxysilyl groups in the graft chains, whereby the crosslink density can be further heightened. Examples of the alkoxysilane include tetramethoxysilane, tetraethoxysilane, methyltrimethoxysilane, methyltriethoxysilane, phenyltrimethoxysilane, phenyltriethoxysilane, dimethyldimethoxysilane, and dimethyldiethoxysilane.

The solid polyelectrolyte film of the invention has a heightened crosslink density and is considerably reduced in the degree of swelling in water and methanol permeability.

The invention further relates to a fuel cell which includes the solid polyelectrolyte film disposed between a fuel electrode and an air electrode. According to the invention, the constitution and structure of the fuel cell except the solid polyelectrolyte film are not limited. However, since the solid polyelectrolyte film of the invention has a low methanol permeability, direct-methanol type fuel cell is preferable.

EXAMPLES

The invention will be further explained below by reference to Examples and Comparative Examples. However, the invention should not be construed as being limited by the following Examples.

Example 1

Styrene/Vinyltrimethoxysilane Co-Graft Electrolyte Film (1) Styrene (St)/Vinyltrimethoxysilane (VMOS) Co-Graft Polymerization ETFE films having a width of 5 cm, length of 6 cm, and thickness of 25 μm (manufactured by Norton) were irradiated with 5-kGy electron beams using a low-voltage electron beam irradiator (Light Beam L, manufactured by Iwasaki Electric Co., Ltd.) in a nitrogen atmosphere (accelerating voltage, 100 kV). On the other hand, 22 mg of AIBN was dissolved in 11.0 g of St to prepare a 0.20% by mass initiator solution.

Into a 25-mL test tube equipped with a three-way stop-cock were introduced three of the ETFE films which had been irradiated with electron beams, 5.52 g of St, 2.52 g of the initiator solution, and 17.0 g of VMOS. After nitrogen bubbling was conducted at room temperature for 0.5 hours, the three-way stop-cock was closed and graft polymerization was conducted in a 63° C. oil bath for 17 hours to obtain St-VMOS co-graft films. The liquid reaction mixture had not gelled at the time of completion of the graft polymerization. Each St-VMOS co-graft film was washed with xylene and vacuum-dried at 100° C. for 2 hours. From a film weight change through the grafting, the degree of grafting was determined using the following equation.

Degree of grafting=[(film weight after grafting)−(film weight before grafting)]/(film weight before grafting)×100(%)

The degrees of grafting of those St-VMOS co-graft films were 46-48%.

(2) Crosslinking of the St-VMOS Co-Graft Films

Three grams of 2-M hydrochloric acid was mixed with 22 g of DMF to prepare an HCl/$H_2O$+DMF solution. Into each of 25-mL test tubes were introduced one of the St-VMOS co-graft films and the HCl/$H_2O$+DMF solution to conduct hydrolysis at room temperature for 12 hours. Each St-VMOS co-graft film was then heated under reduced pressure at 100° C. for 2 hours and subsequently at 130° C. for 2.5 hours to cause the film to undergo dehydrating condensation and crosslinking. Thus, crosslinked St-VMOS co-graft films were obtained.

(3) Sulfonation of the Crosslinked St-VMOS Co-Graft Films

A chlorosulfonic acid/dichloroethane solution was prepared by mixing 7.5 mL of chlorosulfonic acid with 17.5 mL of dichloroethane. Into each of 25-mL test tubes equipped with a Dimroth condenser were introduced one of the crosslinked St-VMOS co-graft films and the chlorosulfonic acid/dichloroethane solution. The film was sulfonated in a 50° C. oil bath for 2 hours. After the treatment, each film was washed with dichloroethane and pure water and vacuum-dried at 100° C. for 2 hours. It is known that the sulfonation of styrene proceeds quantitatively. From a weight change through the sulfonation, the molar proportion of VMOS in the graft chains was found to be about 3% by mole. Subsequently, the sulfonated films were placed in a 25-mL test tube together with 10 w/v % aqueous KOH solution and hydrolyzed in a 100° C. oil bath for 2 hours to obtain K-form electrolyte films. These K-form electrolyte films were washed with pure water and vacuum-dried at 100° C. for 2 hours. Finally, the K-form electrolyte films were placed in a 25-mL test tube together with 2-M hydrochloric acid and ion exchange was conducted in a 100° C. oil bath for 2 hours. The films were then washed with pure water and vacuum-dried at 100° C. for 2 hours to obtain H-form electrolyte films.

Example 2

Styrene/Trimethoxysilylstyrene Co-Graft Electrolyte Film A (1) St/Trimethoxysilylstyrene (MOSS) Co-Grafting ETFE films having a width of 5 cm, length of 6 cm, and thickness of 25 μm (manufactured by Norton) were irradiated with 20-kGy or 40-kGy electron beams using a low-voltage electron beam irradiator (Light-Beam L, manufactured by Iwasaki Electric Co., Ltd.) in a nitrogen atmosphere (accelerating voltage 100 kv). On the other hand, 19 mg of AIBN was dissolved in 19.0 g of toluene to prepare a 0.10% by mass initiator solution. Into a 25-mL test tube equipped with a three-way stop-cock were introduced two of the ETFE films which had been irradiated with 20-kGy electron beams, two of the ETFE films which had been irradiated with 40-kGy electron beams, 3.81 g of St, 8.20 g of MOSS, 3.01 g of the initiator solution, and 9.01 g of toluene. After nitrogen bubbling was conducted at room temperature for 1 hour, the three-way stop-cock was closed and graft polymerization was conducted in a 63° C. oil bath for 17 hours. The solution had not gelled at the time of completion of the graft polymerization. Each St-MOSS co-graft film was washed with xylene and vacuum-dried at 100° C. for 2 hours, and the degree of grafting was determined using the equation given above. The degrees of grafting of the St-MOSS co-graft films which had undergone irradiation with 20-kGy electron beams were 41-42%, while those of the St-MOSS co-graft films which had undergone irradiation with 40-kGy electron beams were 51-52%.

(2) Crosslinking of the St-MOSS Co-Graft Films

Three grams of 2-M hydrochloric acid was mixed with 22 g of DMF to prepare an HCl/$H_2O$+DMF solution. Into a 25-mL test tube were introduced the two St-MOSS co-graft films irradiated with 20-kGy electron beams, the two St-MOSS co-graft films irradiated with 40-kGy electron beams, and the HCl/$H_2O$+DMF solution to conduct hydrolysis at room temperature for 5 hours. Each St-MOSS co-graft film was then heated under reduced pressure at 100° C. for 2.5 hours and subsequently at 130° C. for 3 hours to cause the film to undergo dehydrating condensation and crosslinking. Thus, crosslinked St-MOSS co-graft films were obtained.

(3) Sulfonation of the St-MOSS Co-Graft Films

A chlorosulfonic acid/dichloroethane solution was prepared by mixing 7.5 mL of chlorosulfonic acid with 17.5 mL of dichloroethane. Into a 25-mL test tube equipped with a Dimroth condenser were introduced the two crosslinked St- MOSS co-graft films which had undergone irradiation with 20-kGy electron beams, the two crosslinked St-MOSS co-graft films which had undergone irradiation with 40-kGy electron beams, and the chlorosulfonic acid/dichloroethane solution. The films were sulfonated in a 50° C. oil bath for 2 hours. After the treatment, each film was washed with dichloroethane and pure water and vacuum-dried at 100° C. for 2 hours. From a weight change through the sulfonation, the molar proportions of MOSS in the graft chains were found to be 21-29 mol % for each of the 20-kGy electron beam irradiation and the 40-kGy electron beam irradiation. Subsequently, the sulfonated films were placed in a 25-mL test tube together with 10 w/v % aqueous KOH solution and hydrolyzed for 2 hours in a 100° C. oil bath to obtain K-form electrolyte films. These K-form electrolyte films were washed with pure water and vacuum-dried at 100° C. for 2 hours. Finally, the K-form electrolyte films were placed in a 25-mL test tube together with 2-M hydrochloric acid and ion exchange was conducted in a 100° C. oil bath for 2 hours. The films were then washed with pure water and vacuum-dried at 100° C. for 2 hours to obtain H-form electrolyte films.

Example 3

Styrene/Trimethoxysilylstyrene Co-Graft Electrolyte Film B (1) St/MOSS Co-Grafting In the same manner as in Example 2, films were irradiated with 30-kGy electron beams and St-MOSS co-graft films were obtained. The solution had not gelled at the time of completion of the graft polymerization.
(2) Crosslinking of the St-MOSS Co-Graft Films Three grams of 2-M hydrochloric acid was mixed with 22 g of DMF to prepare an HCl/H$_2$O+DMF solution. Into a 25-mL test tube were introduced four of the St-MOSS co-graft films and the HCl/H$_2$O+DMF solution to conduct hydrolysis at room temperature for 11 hours. The St-MOSS co-graft films were then heated under reduced pressure at 100° C. for 2 hours and subsequently at 200° C. for 7 hours to cause the films to undergo dehydrating condensation and crosslinking. Thus, crosslinked St-MOSS co-graft films were obtained.
(3) Sulfonation of the St-MOSS Co-Graft Films The crosslinked St-MOSS co-graft films were sulfonated in the same manner as in Example 2 to obtain H-form electrolyte films.

Example 4

Styrene/Trimethoxysilylstyrene Co-Graft Electrolyte Film C (1) St/MOSS Co-Grafting In the same manner as in Example 2, films were irradiated with 30-kGy electron beams and St-MOSS co-graft films were obtained. The solution had not gelled at the time of completion of the graft polymerization.
(2) Crosslinking of the St-MOSS Co-Graft Films Three grams of 2-M hydrochloric acid was mixed with 22 g of DMF to prepare an HCl/H$_2$O+DMF solution. Into a 25-mL test tube were introduced four of the St-MOSS co-graft films and the HCl/H$_2$O+DMF solution to conduct hydrolysis at room temperature for 11 hours. The St-MOSS co-graft films were then dried at 0° C. for 2 hours under reduced pressure and immersed in a 1% by mass toluene solution of dibutyltin dilaurate at 60° C. for 5 hours (film weight increase, 8.4% by mass). Under reduced pressure, these films were then heated at 100° C. for 1 hour and subsequently at 200° C. for 1.5 hours to cause the films to undergo dehydrating condensation and crosslinking. Thus, crosslinked St-MOSS co-graft films were obtained.
(3) Sulfonation of the St-MOSS Co-Graft Films The crosslinked St-MOSS co-graft films were sulfonated in the same manner as in Example 2 to obtain H-form electrolyte films.

Example 5

Co-Graft/Silica Hybrid Electrolyte Film A (1) Co-Hydrolysis/Dehydrating Condensation of Tetramethoxysilane (TMOS) with St-MOSS Co-Graft Electrolyte Film Thirteen grams of TMOS was mixed with 10 g of methanol to prepare a TMOS/methanol solution. Into a 25-mL test tube were introduced one St-MOSS co-graft electrolyte film having a degree of grafting of 51% (irradiated with 40-kGy electron beams) and the TMOS/methanol solution. The contents were heated in a 60° C. oil bath for 12 hours to impregnate the film with TMOS. Thereafter, the St-MOSS co-graft electrolyte film impregnated with TMOS was dried under reduced pressure at 100° C. for 0.5 hours. Subsequently, this St-MOSS co-graft electrolyte film impregnated with TMOS and 2-M hydrochloric acid were placed in a 25-mL test tube to conduct hydrolysis at room temperature for 1 hour. The film was then heated under reduced pressure at 150° C. for 0.3 hours and subsequently at 200° C. for 3 hours to cause dehydrating condensation and crosslinking. Thus, an St-MOSS co-graft/silica hybrid electrolyte film was obtained. The film weight increased by 7.6% by mass.

Example 6

Co-Graft/Silica Hybrid Electrolyte Film B (1) Co-Hydrolysis/Dehydrating Condensation of TMOS with St-MOSS Co-Graft Electrolyte Film Thirteen grams of TMOS was mixed with 10 g of methanol to prepare a TMOS/methanol solution. Into a 25-mL test tube were introduced one St-MOSS co-graft electrolyte film having a degree of grafting of 42% (irradiated with 20-kGy electron beams) and the TMOS/methanol solution. The contents were heated in a 60° C. oil bath for 15 hours to impregnate the film with TMOS. Subsequently, this St-MOSS co-graft electrolyte film impregnated with TMOS and 2-M hydrochloric acid were placed in a 25-mL test tube to conduct hydrolysis at room temperature for 1 hour. The film was then heated under reduced pressure at 130° C. for 6 hours to cause dehydrating condensation and crosslinking. Thus, an St-MOSS co-graft/silica hybrid electrolyte film was obtained. The film weight increased by 5.3% by mass.

Comparative Example 1

Styrene Single-Graft Electrolyte Film (1) St Single-Graft Polymerization

ETFE films having a width of 5 cm, length of 6 cm, and thickness of 25 μm (manufactured by Norton) were irradiated with 2-kGy electron beams using a low-voltage electron beam irradiator (Light-Beam L, manufactured by Iwasaki Electric Co., Ltd.) in a nitrogen atmosphere (accelerating voltage 100 kV). On the other hand, 19 mg of AIBN was dissolved in 19.2 g of toluene to prepare a 0.10% by mass initiator solution. Into a 25-mL test tube equipped with a three-way stop-cock were introduced two of the ETFE films which had been irradiated with electron beams, 12.0 g of St 2.99 g of the initiator solution, and 8.99 g of toluene. After nitrogen bubbling was conducted at room temperature for 0.5 hours, the three-way stop-cock was closed and graft polymerization was conducted in a 63° C. oil bath for 16 hours. The solution had not gelled at the time of completion of the graft polymerization. The St single-graft films were washed with xylene and vacuum-dried at 100° C. for 2 hours. The degrees of grafting thereof were 40-41%.

(2) Sulfonation of the St Single-Graft Films

A chlorosulfonic acid/dichloroethane solution was prepared by mixing 7.5 mL of chlorosulfonic acid with 17.5 mL of dichloroethane. Into a 25-mL test tube equipped with a Dimroth condenser were introduced the two St single-graft films and the chlorosulfonic acid/dichloroethane solution. The films were sulfonated in a 50° C. oil bath for 2 hours. After the treatment, the films were washed with dichloroethane and pure water and vacuum-dried at 100° C. for 2 hours. The degree of sulfonation of the styrene was 99%. Subsequently, the two sulfonated films were placed in a 25-mL test tube together with 10 w/v % aqueous KOH solution and hydrolyzed in a 100° C. oil bath for 2 hours to obtain K-form electrolyte films. These K-form electrolyte films were washed with pure water and vacuum-dried at 100° C. for 2 hours. Finally, the two K-form electrolyte films were placed in a 25-mL test tube together with 2-M hydrochloric acid and ion exchange was conducted in a 100° C. oil bath for 2 hours. The films were then washed with pure water and vacuum-dried at 100° C. for 2 hours to obtain H-form electrolyte films.

Comparative Example 2

Styrene/Divinylbenzene Co-Graft Electrolyte Film (1) St/Divinylbenzene (DVB) Co-Graft Polymerization ETFE films having a width of 5 cm, length of 6 cm, and thickness of 25 μm (manufactured by Norton) were irradiated with 2-kGy electron beams in a nitrogen atmosphere in the same manner as in Comparative Example 1 (accelerating voltage, 100 kV). On the other hand, 19 mg of AIBN was dissolved in 19.2 g of toluene to prepare a 0.10 wt % initiator solution. Into a 25-mL test tube equipped with a three-way stop-cock were Introduced two of the ETFE films which had been irradiated with electron beams, 11.4 g of St, 0.57 g of 55% DVB, 2.99 g of the initiator solution, and 8.99 g of toluene. After nitrogen bubbling was conducted at room temperature for 0.5 hours, the three-way stop-cock was closed and graft polymerization was conducted in a 63° C. oil bath for 16 hours. At the time of completion of the graft polymerization, the solution had gelled. The St/DVB co-graft films were taken out of the gel, and the adherent gel was physically removed. Thereafter, the films were washed with xylene and vacuum-dried at 100° C. for 2 hours. The degrees of grafting thereof were 38-42%.

(2) Sulfonation of the St/DVB Co-Graft Films

A chlorosulfonic acid/dichloroethane solution was prepared by mixing 7.5 mL of chlorosulfonic acid with 17.5 mL of dichloroethane. Into a 25-mL test tube equipped with a Dimroth condenser were introduced the two St/DVB co-graft films and the chlorosulfonic acid/dichloroethane solution. The films were sulfonated in a 50° C. oil bath for 2 hours. After the treatment, the films were washed with dichloroethane and pure water and vacuum-dried at 100° C. for 2 hours. The degrees of sulfonation of the styrene were 97-98%. Subsequently, the two sulfonated films were placed in a 25-mL test tube together with 10 w/v % aqueous KOH solution and hydrolyzed in a 100° C. oil bath for 2 hours to obtain K-form electrolyte films. These K-form electrolyte films were washed with pure water and vacuum-dried at 100° C. for 2 hours. Finally, the two K-form electrolyte films were placed in a 25-mL test tube together with 2-M hydrochloric acid and ion exchange was conducted in a 100° C. oil bath for 2 hours. The films were then washed with pure water and vacuum-dried at 100° C. for 2 hours to obtain H-form electrolyte films.

Property Evaluation

Properties of each of the electrolyte films of Examples 1 to 6 and Comparative Examples 1 and 2 were examined by the following methods. The results thereof are shown in Table 1. Each value in the table is an average value.

(i) Ion-Exchange Capacity

A simple method was used in which the capacity was determined from a difference in weight between the K-form electrolyte and the H-form electrolyte using the following equation.

Ion-exchange capacity=[(weight of K-form electrolyte film)−(weight of H-form electrolyte film)]/
[(atomic weight of K)−(atomic weight of H)]/
(weight of H-form electrolyte film)

(ii) Degree of Swelling in Water

The degree of swelling in water was determined from a difference between the weight of a hydrous film prepared by immersing the electrolyte film in 60° C. pure water and then allowing it to cool and the weight of a dry film which had been vacuum-dried at 100° C., using the following equation.

Degree of swelling in water=[(weight of hydrous film)−(weight of dry film)]/(weight of dry film)

(iii) Methanol Permeability

The electrolyte film was used to separate 10-M aqueous methanol solution and pure water. The amount of methanol which had moved from the aqueous methanol solution side to the pure water side through the electrolyte film at room temperature was determined by gas chromatography.

(iv) Ion Conductivity

The lengthwise-direction resistance of a strip sample (width, 1 cm) was measured at room temperature with an impedance analyzer (1260, manufactured by Solartron) by the four-terminal alternating-current impedance method.

TABLE 1

| | Degree of grafting (mass %) | Proportion of alkoxy group-containing monomer (mol %) | Amount of silica added (mass %) | Ion-exchange capacity (meq/g) | Degree of swelling (mass %) | Methanol permeability ($10^{-7} m^2/hr$) | Ion conductivity (S/cm) |
|---|---|---|---|---|---|---|---|
| Example 1 | 47 | 3 | 0 | 2.4 | 60 | 1.7 | 0.14 |
| Example 2 | 41 | 26 | 0 | 1.9 | 30 | 1.1 | 0.079 |
| | 52 | 29 | 0 | 2.4 | 46 | 1.6 | 0.092 |
| Example 3 | 49 | 21 | 0 | 1.9 | 39 | 1.5 | 0.094 |
| Example 4 | 50 | 25 | 0 | 1.8 | 40 | 1.6 | 0.089 |

TABLE 1-continued

| | Degree of grafting (mass %) | Proportion of alkoxy group-containing monomer (mol %) | Amount of silica added (mass %) | Ion-exchange capacity (meq/g) | Degree of swelling (mass %) | Methanol permeability ($10^{-7}m^2/hr$) | Ion conductivity (S/cm) |
|---|---|---|---|---|---|---|---|
| Example 5 | 51 | 22 | 7.6 | — | 17 | 0.95 | 0.014 |
| Example 6 | 42 | 22 | 5.3 | — | 26 | 1.3 | 0.074 |
| Comparative Example 1 | 41 | 0 | 0 | 2.1 | 52 | 1.8 | 0.14 |
| Comparative Example 2 | 42 | 0 | 0 | 2.1 | 29 | 1.7 | 0.096 |

It was confirmed from the Examples and Comparative Examples that, by grafting a polymerizable monomer having an alkoxysilyl group and then conducting hydrolysis and dehydrating condensation, solution gelation is prevented and a solid polyelectrolyte film which has excellent dimensional stability, a low methanol permeability, and an increased ion conductivity is obtained.

The invention claimed is:

1. A process for producing a solid polyelectrolyte film by graft-polymerizing a polymerizable monomer with a fluororesin film which has been irradiated with a radiation, said process comprising the steps of:
    (a) irradiating a fluororesin film with a radiation;
    (b) graft-polymerizing at least one polymerizable monomer having an alkoxysilyl group which is selected from the group consisting of trimethoxysilylstyrene, triethoxysilylstyrene, vinylbenzyltrimethoxysilane, vinylbenzyltriethoxysilane, vinylphenethyltrimethoxysilane and vinylphenethyltriethoxysilane, and at least one monomer selected from the group consisting of styrene, α-methylstyrene and trifluorostyrene, with the fluororesin film which has been irradiated with the radiation;
    (c) hydrolyzing the alkoxysilyl group to conduct a dehydrating condensation; and
    (d) introducing a sulfo group into a graft chain through a sulfonation reaction.

2. A solid polyelectrolyte film which is obtainable by the process according to claim 1.

3. A fuel cell, which comprises the solid polyelectrolyte film according to claim 2 disposed between a fuel electrode and an air electrode.

4. The fuel cell according to claim 3, which is of the direct-methanol type in which methanol is used as a fuel.

* * * * *